(No Model.) 3 Sheets—Sheet 1.
A. W. STEERS.
COMBINED TABLE AND CULINARY RECEPTACLE.
No. 326,526. Patented Sept. 15, 1885.
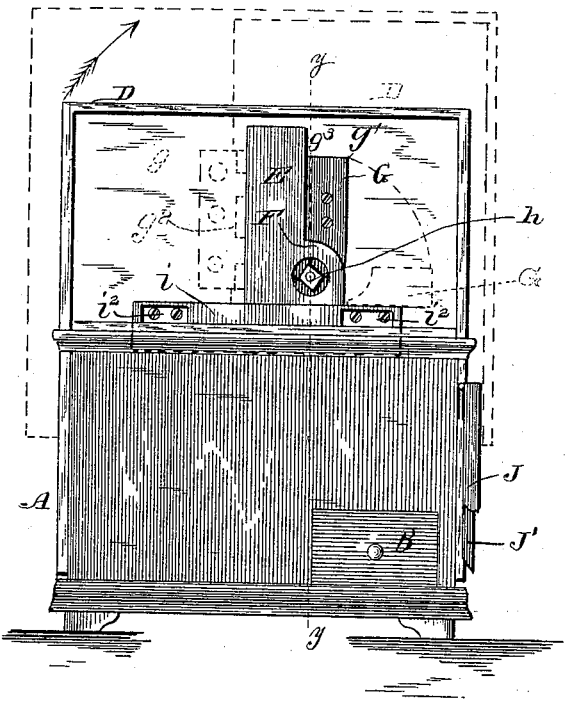
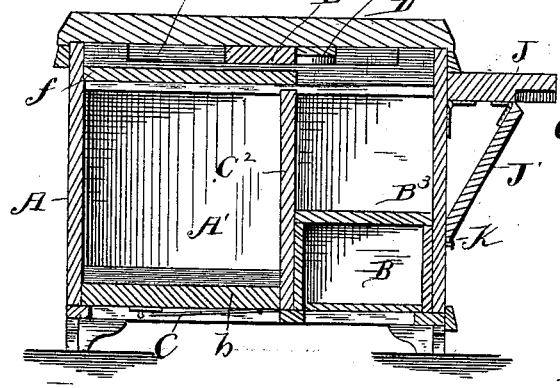
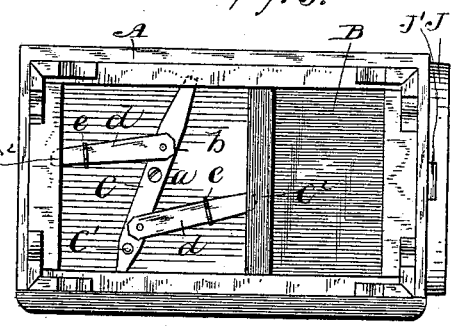
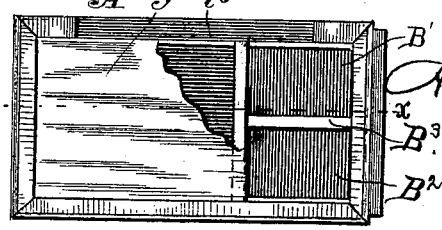
Witnesses
W. E. Bowen
Thos. McGill
Inventor:
Albert W. Steers
By Myra & Co
Attorneys (No Model.)  3 Sheets—Sheet 2.
A. W. STEERS.
COMBINED TABLE AND CULINARY RECEPTACLE.
No. 326,526. Patented Sept. 15, 1885.
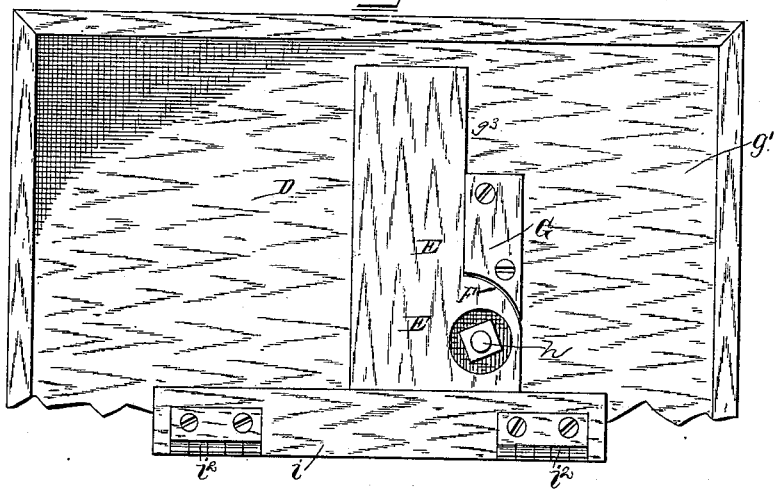
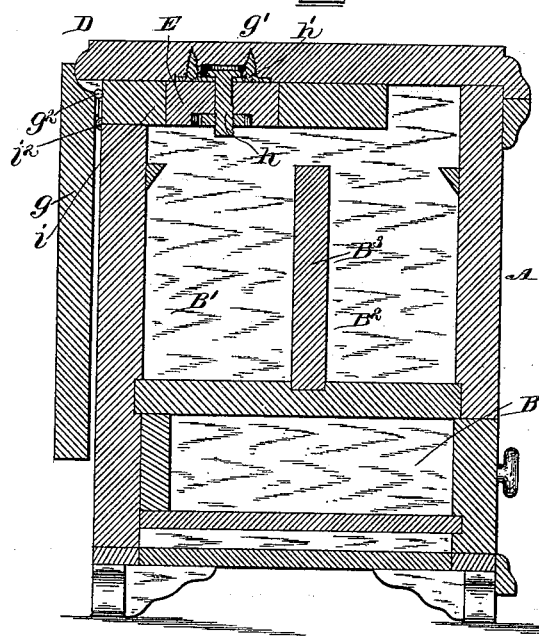

(No Model.) 3 Sheets—Sheet 3.
A. W. STEERS.
COMBINED TABLE AND CULINARY RECEPTACLE.
No. 326,526. Patented Sept. 15, 1885.
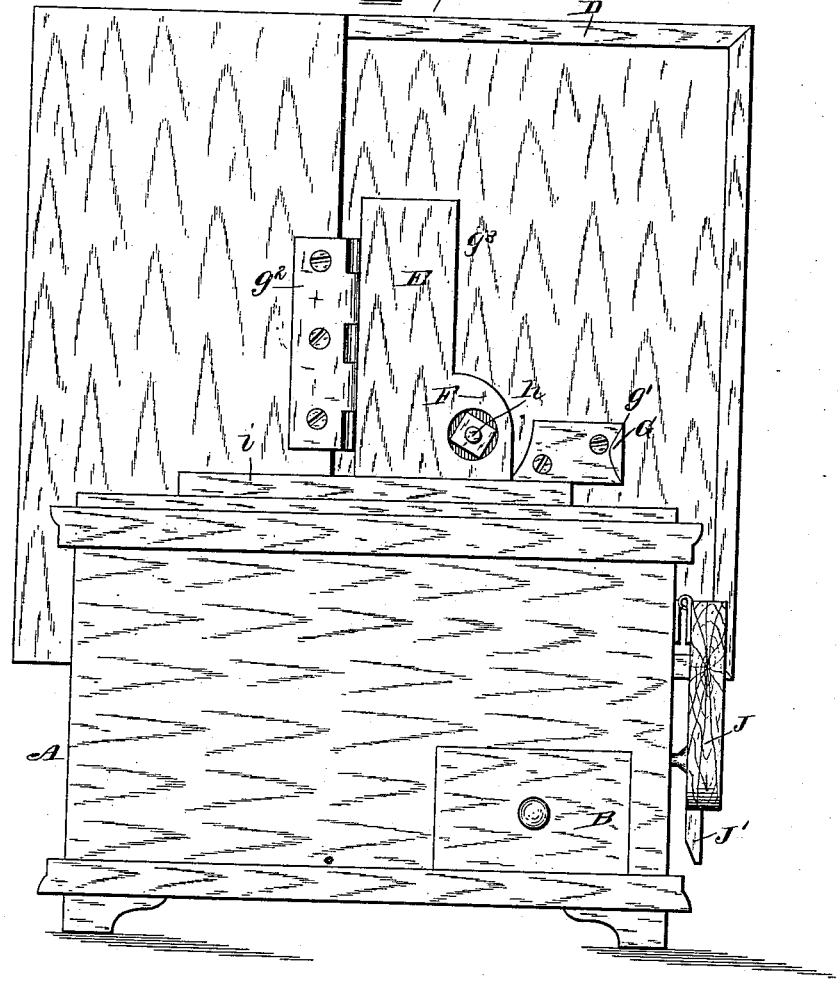

UNITED STATES PATENT OFFICE.

ALBERT W. STEERS, OF STRAWN, ILLINOIS.

COMBINED TABLE AND CULINARY RECEPTACLE.

SPECIFICATION forming part of Letters Patent No. 326,526, dated September 15, 1885.

Application filed October 7, 1884. (No model.)

*To all whom it may concern:*

Be it known that I, ALBERT W. STEERS, a citizen of the United States of America, residing at Strawn, in the county of Livingston and State of Illinois, have invented certain new and useful Improvements in Combined Table and Culinary Receptacle, of which the following is a specification, reference being had therein to the accompanying drawings.

The object of my combined table and culinary receptacle is to embody in one and the same device an article of furniture for the kitchen or pantry, which may be employed for several distinct purposes, its several apartments serving as receptacles for such kitchen materials, as flour, meal, spices, &c. It is also provided with an interior cover or breadboard serving the purpose of a board whereon to knead dough in the process of making bread, a folding lid removable, adjustable, and adapted to transform the chest of apartments into a table having the usual projecting lids, and a lateral shelf for enlarging its surface area; and the invention consists in the novel construction, combination, and arrangement of the parts, substantially as hereinafter more fully shown and described.

In the accompanying drawings, Figure 1 is a side elevation showing the lid lifted and thrown back into a vertical position. Fig. 2 is a cross-section on the line $x\ x$, Fig. 4. Fig. 3 is a plan view showing the removable bottom, and Fig. 4 is also a plan view of my invention, with the cover removed. Fig. 5 is a view of the lid or cover and its hinging attachment, with parts of the latter broken away; and Fig. 6 is a cross-sectional view of my invention on the line $y\ y$, Fig. 1, showing the lid or cover closed, and Fig. 7 is a front view of my invention with the lid or cover shown in the position indicated by dotted lines, Fig. 1.

In constructing my combined table and culinary receptacle, I provide, in the bottom of the chest A, the drawer B, which is arranged to slide in and out, disposed on the usual support and guide strips, and also pivoted at $a$ to the flour-receptacle bottom $b$, the metallic lever C, having pivoted thereto the oppositely-projecting metallic arms $d$, adjustable in guides $e$ by means of thumb-piece C′. This lever and its auxiliary arms $d$ are thus arranged in order that, actuated by thumb-piece C′, the outer projecting ends thereof may be readily inserted in or withdrawn from coincident horizontal recesses provided in the vertical walls $C^2$, which inclose bottom $b$. Bottom $b$ is thus removably secured in the chest in order that it may be readily removed therefrom at intervals when desirable for cleansing the flour-receptacle.

That part of the chest which is immediately above the drawer B is divided into two distinct apartments, B′ and $B^2$, by the vertical wall $B^3$, and the apartment A′, having the removable bottom $b$, is partitioned off from these apartments by the wall $C^2$. Where these apartments terminate at top, narrow strips are rigidly secured to the interior of the longitudinal walls of chest A, which are designed as a suitable support for the bread-board $f$, which may be slid or adjusted thereon, being smaller than the surface area of the chest, and hence the contents of the apartments may be reached without removal of board $f$ from its bearings.

D is the lid or cover of the chest A, and is secured to the rear side of the said chest by means hereinafter described. The lid D comprises two distinct sections, $g$ and $g'$. The section $g$, when not in use, normally rests against the rear side of the chest. The said sections are hinged together by a hinge, $g^2$, as shown in dotted lines, Fig. 1, and in full lines, Fig. 6, and the section $g'$ is pivoted on a nutted bolt, $h$, the head of which is secured in a small recess in the section $g'$ by a flat metallic plate, $h'$, and the bolt passes through an aperture in said plate, which plate is attached to the inside of the said section by ordinary means, and is suitably secured after passing through an arm or catch, E. The bolt $h$, it is obvious, forms the pivotal bearing or axis for and on which the lid or cover D revolves. The said arm or catch E has a portion of its surface removed, as at $g^3$, forming a shoulder, F, the purpose of which will apper further on. To the lower end of the arm or catch E is formed or rigidly secured therewith an oblong bar, $i$, which is hinged to the chest A by hinges $i^2$, secured in the recess $i^3$, to permit of the opening and closing of the lid of the chest.

Secured by ordinary means to the inside of the section $g'$ of the lid is a stud, G, having a rounded portion to fit the correspondingly-shaped shoulder F of the arm or catch E. In turning the lid or cover D in the position shown in dotted lines, Fig. 1, for use as a table, the stud G is turned on the shoulder F, as shown, and the outer portion of said stud rests on the bar $i$ when the lid or cover is turned the desired extent.

The lid is also provided with a flange which projects vertically down over a coincident ridge or tongue formed on the top of the vertical walls of the chest, and the inner side of the flange registers with the outer wall of the tongue.

When lid D is rotated into the position shown in Fig. 1, it may be let down to cover chest A, and the hinged section $g$ will then recline against the side of the chest, after the manner of a folded table-lid, and when arranged, as shown in dotted lines, and folded down, it forms an enlarged table.

The extension-shelf J is hinged to a lateral wall of chest A, and has hinged thereto an arm, J', which, when adjusted to sustain the shelf, rests upon pin K, and this arm, when the shelf is swung down, fits into a corresponding recess formed in the shelf, as does also pin K, which prevents the shelf, when let down or released, from projecting out of a vertical line.

Having thus fully described my invention, what I claim and desire to secure by Letters Patent, is—

1. In a combined table and culinary receptacle, the combination of the chest having apartments, a removable bottom, a drawer, a shelf, and the pivotally-secured lid, constructed and arranged substantially as shown and described.

2. The lid D, composed of hinged sections pivotally connected to arm E, having hinging bar $i$, secured to chest A, substantially as shown and described.

3. The bottom $b$, removably secured by means of lever C, having arms $d$, substantially as shown and for the purpose described.

4. In a combined, table and culinary receptacle, the combination, with the chest and the pivotally-secured lid secured to said chest, as specified, of the removable bottom having guides, and the lever having arms, and a thumb-piece, substantially as shown and described.

5. The lid D, composed of sections $g$ and $g'$, said latter section having a stud, G, having a curved portion, in combination with the chest A, having extension-shelf J, substantially as shown and described.

In testimony whereof I affix my signature in presence of two witnesses.

ALBERT W. STEERS.

Witnesses:
A. P. LA CLAIR,
E. H. ROBERTS.